Patented July 31, 1928.

1,678,984

UNITED STATES PATENT OFFICE.

ROBERT L. HALLETT, OF BROOKLYN, NEW YORK, ASSIGNOR TO NATIONAL LEAD COMPANY, OF NEW YORK, N. Y., A CORPORATION OF NEW JERSEY.

PROCESS FOR REFINING PETROLEUM OILS WITH DOCTOR SOLUTION.

No Drawing. Application filed February 17, 1926. Serial No. 88,927.

This invention relates to the refining of gasoline and like petroleum products and more especially to the production of a refining solution sometimes called the doctor solution, to remove sulphur. After petroleum products such as gasoline have been refined by treatment with acid, it is then necessary to remove sulphur therefrom, for which purpose it has commonly been the custom to use a refining solution prepared by adding litharge to a caustic soda solution until the solution is almost saturated with lead. This solution is thereupon intimately mixed in a suitable receptacle with the gasoline to be refined, from which it takes up the sulphur. After this treatment the refining solution is allowed to settle by gravity in the bottom of the receptacle from which the purified gasoline is then removed.

According to the present invention, the refining solution is prepared by dissolving lead chlorid in dry form in a water solution of caustic soda, usually with the aid of heat. For example, about 500 pounds of dry lead chlorid are added to about 1000 gallons of about 20° Baumé caustic soda solution. The process of mixing the chlorid with the caustic soda is a simple one and readily produces a complete solution and can be accomplished in much less time than is necessary when employing litharge according to the common practice. The reaction of the lead chlorid and the caustic soda produces some sodium chlorid, according to the following formula:

$$PbCl_2 + 4NaOH = Na_2PbO_2 + 2NaCl + 2H_2O$$

Sodium plumbite is one of the components in the new refining solution, as it is in the solution of common practice. The caustic soda is preferably in excess. The sodium chlorid is apparently inert so far as the purification of petroleum is concerned, but its presence in the refining solution facilitates the separation of the latter from the petroleum in the refining vessel and thus expedites the refining process.

Having described my invention the following is claimed.

1. The improvement in the purification of petroleum products which consists in dissolving lead chloride in a caustic soda solution and treating said products with the resulting solution to remove the sulphur therefrom.

2. The improvement in the refining of petroleum products which consists in treating such products with a solution containing sodium chloride, caustic soda, and sodium plumbite.

In testimony whereof, I have signed this specification.

ROBERT L. HALLETT.